United States Patent Office 3,114,342
Patented Dec. 17, 1963

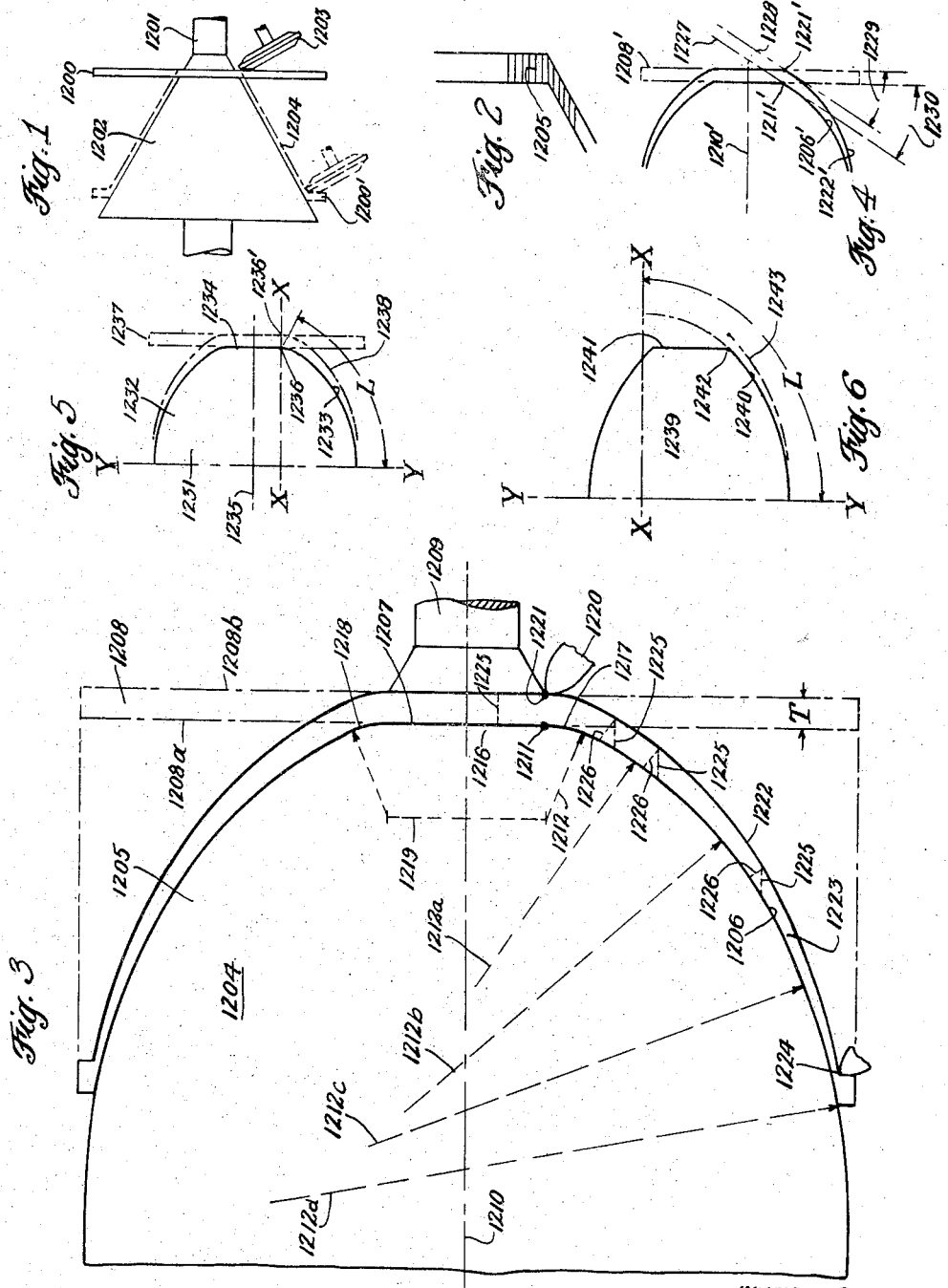

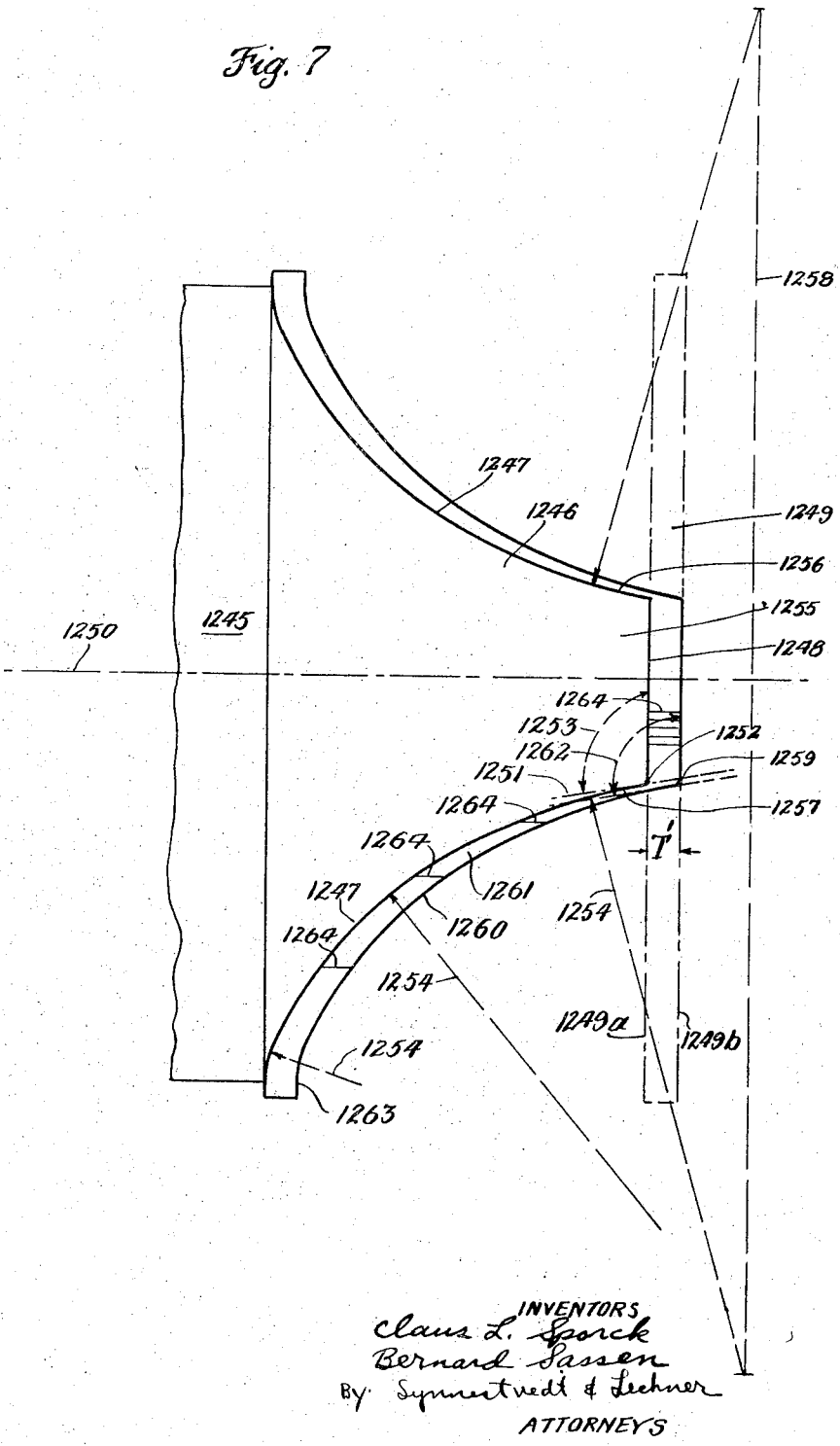

3,114,342
METAL WORKING
Claus L. Sporck and Bernard Sassen, Cincinnati, Ohio, assignors to The Lodge & Shipley Company, Cincinnati, Ohio, a corporation of Ohio
Filed Sept. 9, 1954, Ser. No. 454,871
8 Claims. (Cl. 113—52)

This invention relates to the art of metal working and, in particular, relates to methods for forming hollow articles from sheet metal blanks, for example, by apparatus such as disclosed in our copending application 679,551, filed August 20, 1957, entitled Metal Working which is a division of the present application.

The term "hollow" as used herein will be understood to apply to an article which is frusto-conical in shape, for example, an object similar in shape to a megaphone, and is meant to include an object which has a generally hemispherical shape, such as a bowl or an article which is in the shape of a horn or an object which is generally tubular in shape. Further, the term will be understood to apply to an article, a section of which is shaped as above-mentioned. Also, it will be understood that the term "sheet metal" is inclusive of plate, and of sheet- or plate-like elements, even when formed as castings, forgings, weldments or the like.

The invention contemplates methods for forming hollow articles having sides of tapering thickness, which we believe have never been made heretofore by cold-working with a roller. The taper may be uniform or non-uniform, and the direction of taper may be outwardly or inwardly with respect to the mouth of the article. According to the preferred manner, a blank is supported on a spindle which has a curved surface of revolution. The spindle and the blank are then rotated and the metal of the blank is axially displaced by making a roller follow a curve which is identical to the curve of the spindle surface but axially displaced from the spindle curve by a distance equal to the original thickness of the blank. By using a spindle having a curve defined by a formula which will be described hereinafter, an article having sides of uniform taper may be formed.

The above referred to methods are particularly applicable for the formation of disk-type automobile wheels. Such wheels generally have a flat central portion which is apertured to accommodate the wheel hub. The section of the disk around the central portion is dished so as to provide the centering means for the brake drum and then the disk curves outwardly and has a rim attached to the outer periphery. It is highly desirable in automobile wheels that the outwardly curving portion have a decreasing taper and the above-described methods are ideally suitable for such wheels.

The preferred manner of practising the invention will be apparent from the following description and drawings wherein:

FIGURE 1 illustrates a known method for the forming of conical-shaped articles whose sides have uniform thickness;

FIGURE 2 is a fragmentary view diagrammatically illustrating the displacement of the metal of the blank of FIGURE 1;

FIGURE 3 illustrates how the methods of the invention are used in the forming of a hollow, generally bowl-shaped article having sides of non-uniform tapering thickness, the sides being tangent to the bottom;

FIGURE 4 is a view similar to FIGURE 3 illustrating how the methods of the invention are used for the forming of hollow, bowl-shaped articles having sides of non-uniform tapering thickness, the sides intersecting rather than being tangent to the bottom;

FIGURE 5 illustrates how the methods of the invention are used in the forming of hollow-bowl-shaped articles having sides of uniformly tapering thickness besides being tangent to the bottom;

FIGURE 6 is a view similar to FIGURE 5 illustrating how the methods of the invention are used in the forming of hollow, bowl-shaped articles having sides of uniform taper, the sides intersecting rather than being tangent to the bottom; and FIGURE 7 is a view illustrating how the methods of the invention are used in the forming of hollow, generally horn-shaped articles having sides of tapering thickness.

The prior art has disclosed a method for forming hollow articles by cold-working. As seen in FIGURE 1, this method contemplates a flat blank 1200 of uniform thickness which is clamped by a tail stock 1201 on a frusto-conical-shaped spindle 1202. The blank is rotated and a roller 1203 is used to axially displace the blank into the desired hollow object 1204. The roller moves in a fixed path parallel to the surface of the spindle.

In using such a method, the roller is made to move in a path which is parallel to the spindle surface in order that true axial displacement is obtained. For example, if it is assumed that the blank is made up of parallel strata 1205 (see FIGURE 2), which are perpendicular to the surfaces of the blank, true axial displacement will be obtained if these strata are displaced by the roller such that they remain parallel to one another. True axial displacement is desired because of the ease with which an object can be formed and further, because of certain qualities imparted to the finished object by the orientation of the grain structure.

True axial displacement cannot be obtained with the above method if the roller moves non-parallel or in a direction away from the surface of the spindle because the material of the blank will obviously not be displaced or worked. And if the roller moves non-parallel in a direction toward the surface of the spindle, the metal of the blank may be swedged but not truly displaced. While swedging may be accomplished in a hot-working operation, it is virtually impossible to swedge using the above techniques because of the supporting bearing vs. force required problems. Thus, it will be apparent that axially displaced hollow objects having tapered sides cannot be formed with such a method.

However, we have discovered a method of forming hollow objects having tapered sides which utilizes axial displacement despite the fact a roller is made to follow a path which is not parallel to the surface of the spindle.

In the description of the method which follows, it should be borne in mind that the methods can be practiced on the machine as described in our copending application 679,551 or on a machine such as disclosed in copending application of Claus L. Spork, Serial No. 490,792, filed February 28, 1955, now Patent No. 3,058,205, and entitled Metal Working.

In FIGURE 3 a spindle 1204 has a curved surface of revolution 1205 defined by the curve 1206. The forward part or head of the spindle has a flat circular surface 1207. A blank 1208, which may be flat or cup-shaped, is held on the spindle as by tail stock 1209, the inner surface 1208a of the blank engaging the surface 1207, while the outer surface 1208b is engaged by the tail stock. The periphery of the surface 1207 forms a circle whose center is preferably coincident with the rotational axis 1210. Also, the surface 1210 is perpendicular to the said axis. Thus, the blank is arranged perpendicular to the axis 1210.

The curve 1206 is tangent to a plane containing the surfaces 1207 and 1208a at the point 1211. The curve is made up of a finite or an infinite number of arcs each having an increasing radius taken in a direction away from the axis of the spindle. This is indicated by the radii 1212—1212a through 1212d. In other words, the curve 1206 has a radius of curvature which increases as the curve goes away from the axis of the spindle. The surface of the spindle is formed, so to speak, by the revolution of the curve 1206 and is symmetrical about the axis 1210.

It will be observed that any circumferential portion of the surface 1205, say the portion 1216, has an infinite number of curves (for example, curves 1217 and 1218) whose centers lie in a circle (designated by the dotted line 1219 which represents an elevational view of the circle) coaxial with the axis 1210 and lying in a plane perpendicular to the axis 1210.

With the blank 1208 arranged on the spindle as described, a roller 1220 displaces metal of the blank by starting from a point 1221, which lies in the plane containing the outer surface 1208b. The point 1221 is axially spaced from the tangent point 1211 by the original thickness T of the blank and radially spaced from the axis 1210 the same radial distance as the point 1211. The blank is then rotated and the roller is made to follow a working curve 1222 to displace the metal of the blank and form the object 1223. The working curve 1222 is identical to the surface curve 1206 and is tangent to the surface 1208b or the plane thereof at point 1221.

As the roller moves from its starting point 1221 to some stop point as indicated at 1224, true axial displacement takes place because the strata 1225—1225 remain parallel to each other. Thus, the thickness of the finished object as measured along any point in a direction parallel to the axis 1210, remains equal to the original thickness of the blank.

It will be observed that the thickness 1226—1226 of the finished object, as measured in a direction normal to the surface curve 1206, gradually decreases. The foregoing is brought about by making the roller follow a working curve which is identical to the surface curve but displaced axially therefrom by the original thickness of the blank.

Thus, by using our method, the advantages of axial displacement are utilized and a hollow object is quickly and easily formed. An object such as that shown in FIGURE 3 is ideally suitable for so-called disk-type automobile wheels. The center of the object may be apertured to accommodate the wheel hub while the portion around the center may be dished to provide a centering means for the brake drums. The foregoing may be accomplished by standard press operations, before or after the object is formed, or the dishing operation may be done by providing the head of the spindle with the proper shape and making the roller displace metal to conform to said shape. The outer section of the object may be suitably adapted as by pressing, machining or welding, or other operations to accommodate the wheel rim.

Also, it will be observed that a frusto-conical-shaped object having a tapered wall may be formed from the object shown in FIGURE 3 by a subsequent press operation to flatten out the wall.

Before proceeding, it is desired to point out that the term "original thickness" of the blank is meant to be the thickness of the blank as measured between the inner and outer surfaces of the blank, in a direction generally parallel to the axis of the spindle, and located at the beginning of the portion of the blank to be displaced into a taper. For example, in FIGURE 3, the original thickness is measured between the points 1211 and 1221.

The blank 1208 is shown to have a substantially uniform thickness; however, there may be some instance where the thickness of the blank may be non-uniform. For example, the portion of the blank which is clamped between the tail stock and the surface 1207 may be greater in thickness than the portion outside of the clamping area. Also, there may be some instances where the thickness of the blank outside of the clamping area may be non-uniform.

While in the above-described embodiment, the spindle is constructed so that the surface curve 1206 is tangent at point 1211, the spindle may be constructed so that the surface curve intersects at point 1211. With such an arrangement, a roller is moved similarly as above-described, i.e., so that its working curve is displaced axially from the surface curve by the original thickness of the blank. The relationship is shown in FIGURE 4 where the surface curve 1206' and the working curve 1222' intersect planes (respectively containing the inner and outer surfaces of a blank 1208') perpendicular to the axis 1210' at points 1211' and 1221'. It will be noted that the tangents 1227 and 1228 at points 1211' and 1221' form equal angles 1229 and 1230 respectively with the planes containing the points.

The spindle may also be constructed such that the surface curve is an arc of a circle, i.e., the radius of curvature remains constant as the surface curve goes away from the axis of the spindle. The curve may be of the tangent type or the intersecting type as mentioned above. Further, the curve may have a changing direction. In any of these embodiments, the roller is moved in the same manner as mentioned.

Further, it will be apparent that the surface 1207 may include only a very small area such that the head of the spindle is substantially a point. In such a case the same principles as described heretofore apply.

The foregoing describes the method of the invention as applied to making hollow articles having sides of non-uniform taper. Such articles may be made, however, with sides of uniform taper as described following. In FIGURE 5 a spindle 1231 has a curved surface of revolution 1232 defined by the curve 1233. The head of the spindle has a flat disk-like surface 1234, the plane of which is perpendicular to the spindle axis 1235. The curve 1233 is tangent to the surface or plane at 1236.

The X—X represents the axis of the ordinate of the curve 1233 and is parallel to the axis 1235 and contains the point 1236. The Y—Y represents the axis of the abscissa of the curve 1233. The curve 1233 is defined by the equation appearing below:

$$x = L\left[-\frac{\sqrt{1-2y}\cdot\sqrt{2y}}{2} - \frac{\sin^{-1}\sqrt{1-2y}}{2} + \frac{\pi}{4}\right]$$

where

L is the total length of the curve,
y is a distance along the axis of the abscissa, and
x is a distance along the axis of the ordinate both taken from the intersection of X—X and Y—Y.

With a spindle constructed in accordance with the formula, a roller is made to displace a blank 1237 by starting from a point 1236' and following a working curve 1238, which is identical to the surface curve 1233 but axially displaced therefrom by the original thickness of the blank. The points 1236 and 1236' represent the original thickness of the blank and the working curve 1238 is tangent to the plane of the outer surface of the blank at point 1236'. The object formed will have a side which has a uniformly decreasing taper.

It is pointed out that the ordinate X—X may be at any desired distance from the axis of the spindle such that the surface 1234 is large, as indicated in FIGURE 5, or may be substantially coincident with the axis such that the surface is very small or substantially a point.

Further, it is pointed out that the surface curve 1233 may be of the intersecting type. This is shown in FIGURE 6, where a spindle 1239 has a surface curve 1240 which is a portion of the total length L, curve 1239 intersecting the plane of the circular surface 1241 of the spindle 1242. A roller is then made to follow a working curve as indicated at 1243 until the desired reduction is obtained.

In any of the above embodiments, whether the taper is to be uniform or non-uniform, and whether the curve is to be of the tangent or intersecting type, the object may be formed without the use of a mandrel by following the methods disclosed in copending application of Claus L. Sporck Serial No. 650,277 filed April 2, 1957, and being a division of application of Claus L. Sporck, Serial No. 407,010, filed January 29, 1954.

The foregoing description concerned the formation of a hollow object whose side had a decreasing taper in a direction toward the mouth of the object. The following concerns the application of the method of the invention in forming a hollow object whose side has an increasing taper in a direction toward the mouth of the object.

In FIGURE 7 a spindle 1245 has a curved surface of revolution 1246 defined by the curve 1247. The forward part or head of the spindle has a flat circular surface 1248. A blank 1249, which may be flat or cup-shaped, is held on the spindle by a tail stock (not shown), the inner surface 1249a of the blank engaging the surface 1248 of the spindle, while the outer surface 1249b of the blank is engaged by a tail stock. The periphery of the surface 1248 forms a circle whose center is coincident with the rotational axis 1250. Also, the surface 1248 is perpendicular to the said axis. The surface of the spindle is formed, so to speak, by the revolution of the curve 1247 and is symmetrical about the axis 1250.

The curve 1247 intersects a plane containing the surfaces 1248 and 1249a and the tangent 1251 at the point of intersection 1252 makes an angle 1253, which is greater than 90° with said plane. The curve 1247 is made up of a finite or an infinite number of arcs each having a decreasing radius taken in a direction away from the head of the spindle, this being indicated by the radii 1254—1254. In other words, the curve 1247 has a radius of curvature which decreases as the curve goes away from the axis of the spindle.

It will be observed that any portion of the surface 1246, say portion 1255, has an infinite number of curves (for example, curves 1256 and 1257) whose centers lie in a circle (designated by the dotted line 1258) coaxial with and perpendicular to the axis 1250.

With a blank arranged on the spindle as described, a roller displaces metal of the blank by starting from a point 1259 which lies in the plane containing the outer surface 1249b. The point 1259 is spaced from the point 1252 by the original thickness T' of the blank and radially spaced from the axis 1250 the same as point 1252. The blank is rotated and a roller is made to follow a working curve 1260 to displace metal of the blank to form the object 1261. The working curve 1260 is identical to the surface curve 1247 and intersects the outer surface 1249b or the plane thereof at point 1259. The tangent at point 1259 makes an angle 1262 with the surface 1249b which is equal to angle 1253.

As a roller moves from its starting point to some stop point, as indicated at 1263, true axial displacement takes place because the strata 1264—1264 remain parallel to each other. Thus, the thickness of the finished object as measured along any point in a direction parallel to the axis 1250 remains equal to the original thickness of the blank. It will be observed that the thickness of the side of the object has a gradually increasing taper in a direction toward the mouth of the object.

While in the above-described embodiment the spindle is constructed such that the surface curve 1247 intersects a plane through the surface 1248, the spindle may be constructed such that the surface curve is normal to a plane through the surface 1248. With such an arrangement a roller is moved similarly as above-described, i.e., so that the working curve is axially displaced from the surface curve by the original thickness of the blank.

Also, the spindle may be constructed so that the surface curve is an arc of a circle, i.e., the radius of curvature remains constant as the curve goes away from the axis of the spindle. In the latter embodiment, the surface curve may be of the tangent or intersecting type. Further, it will be apparent that the surface 1248 may include only a very small area such that the head of the spindle is substantially a point. In such cases the principles described in connection with the movement of the roller apply.

While the description of the methods of the invention has been described in connection with only a single roller, it will be apparent that a plurality of rollers can be used. For example, where two rollers are used, their working curves are symmetrical to the axis of the spindle.

We claim:

1. A method of forming hollow articles by supporting a blank on a spindle defined by a curved surface of revolution and while the spindle and blank are rotating, moving a roller in contact with the blank to displace metal of the blank, characterized by making said roller follow a path having the same curvature as the curve defining said surface, the path being non-parallel to said surface and displaced therefrom in a direction parallel to the axis of the spindle by a distance substantially equal to the original thickness of the blank to axially displace metal of the blank and thereby form a hollow article whose side is of tapering thickness.

2. A method in accordance with claim 1 wherein said curve and said path are related so that the side of the formed article has a taper decreasing in a direction toward the mouth of the article.

3. A method in accordance with claim 2 wherein the tangent of the curve, at the starting point of working, lies in a plane normal to the rotational axis of the spindle.

4. A method in accordance with claim 2 wherein the tangent of the curve, at the starting point of working, intersects a plane normal to the rotational axis of the spindle.

5. A method in accordance with claim 1 wherein said curve and said path are related so that the side of the formed article has a taper increasing in a direction toward the mouth of the article.

6. A method in accordance with claim 5 wherein the tangent of the curve, at the starting point of working, lies in a plane parallel to the rotational axis of the spindle.

7. A method in accordance with claim 5 wherein the tangent of the curve, at the starting point of working, intersects a plane parallel to the rotational axis of the spindle.

8. A method in accordance with claim 1 wherein the curve is defined by the equation:

$$x = L\left[ -\frac{\sqrt{1-2y} \cdot \sqrt{2y}}{2} - \frac{\sin^{-1}\sqrt{1-2y}}{2} + \frac{\pi}{4} \right]$$

where (a) where L is the total length of the working curve,
(b) y is a distance along the axis of the abscissa of the curve, the axis lying in a plane normal to the rotational axis of the tool,
(c) x is a distance along the axis of the ordinate of the curve, the axis lying in a plane normal to the plane of (b),
(d) the curve being tangent to a plane disposed from the plane of (b) and normal to the plane of (c), the tangent point defining one end of the curve.

References Cited in the file of this patent

UNITED STATES PATENTS

| | | |
|---|---|---|
| Re. 19,790 | Lindgren | Dec. 17, 1935 |
| 2,398,438 | Metzner | Apr. 16, 1946 |
| 2,624,303 | Ghormley | Jan. 6, 1953 |
| 2,624,304 | Ghormley | Jan. 6, 1953 |
| 2,686,489 | Kaestner | Aug. 17, 1954 |

FOREIGN PATENTS

| | | |
|---|---|---|
| 344,473 | Great Britain | Mar. 4, 1931 |
| 436,768 | Great Britain | Oct. 17, 1935 |